United States Patent Office 2,949,404
Patented Aug. 16, 1960

2,949,404
METHOD OF PRODUCING ALLO-ISOCITRIC ACID BY FERMENTATION

Kinichiro Sakaguchi, Shigeo Abe, and Teruhiko Beppu, Tokyo, Japan, assignors to Kyowa Hakko Kogyo Kabushiki Kaisha, Tokyo, Japan, a corporation of Japan No Drawing. Filed July 1, 1958, Ser. No. 745,813

11 Claims. (Cl. 195—36)

This invention relates to a method of producing allo-isocitric acid by a fermentation process in which a fungus is cultivated in a liquid or solid nutrient medium comprising various carbohydrate materials, inorganic salts and nitrogen sources, and allo-isocitric acid is recovered from the fermented medium.

Allo-isocitric acid is a diasteroisomer of natural occurring isocitric acid which is a member of Krebs' citric acid cycle. The configurations at $\beta$-carbon of both substances are just reversed (Teruhiko Beppu et al.: Journal of General and Applied Microbiology, vol. 3, No. 4, 1957, Tokyo, Japan).

Accordingly, this substance is Ls-allo-isocitric acid. This is easily soluble in water and has a fresh sour taste. It can, therefore, be successfully used as a constituent of a refreshing drink in place of citric acid, as used heretofore.

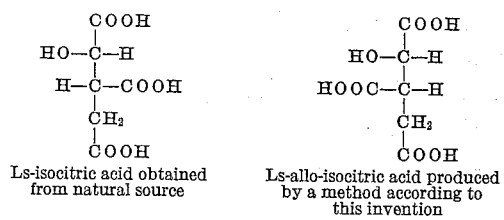

Ls-isocitric acid obtained from natural source

Ls-allo-isocitric acid produced by a method according to this invention

After extensive investigations with respect to fermentation processes for manufacturing allo-isocitric acid, it has been discovered that several fungi listed below have an ability to produce allo-isocitric acid. It is an object of this invention to provide an industrial method of producing allo-isocitric acid by fermentation employing said fungi.

The fungi which may be used according to the present invention belong to the genus, Penicillium, among which the following are particularly remarkable in their ability to produce allo-isocitric acid:

(1) *Penicillium purpurogenum* Stoll var. *rubri-sclerotium* Thom (sclerotia producing strains and non-sclerotigenic type),
(2) *Penicillium sclerotiorum* van Beyma,
(3) *Penicillium expansum* (Link) Thom,
(4) *Penicillium verruculosum* Peyronel and
(5) *Penicillium aculeatum* Raper and Fennell.

These fungi are described in "Atlas of Microorganisms. The Penicillia," 1957, published in Tokyo, Japan, and "Studies on the Classification of the Penicillia," Journal of General and Applied Microbiology, vol. 2, Nos. 1–3, 1956, Japan.

Among the fungi, as to fungi numbered (1) above, it has been taught by Dr. Thom that the strain of *Penicillium purpurogenum* Stoll var. *rubri-sclerotium* Thom No. 2670 produces gluconic acid. However, according to the study of the present inventors, strains which belong morphologically to the same genus, which are used in the present invention, do not produce gluconic acid but allo-isocitric acid. Therefore the fungi belonging to (1) above are characterized by "sclerotia producing strains and nonsclerotigenic type" which are clearly distinguished from Dr. Thom's strain.

Nutrient media contemplated for the fermentation according to this invention are set forth below:

| Ingredient | Percent by weight | |
|---|---|---|
| | Preferred medium | Modified Czapek's medium |
| Glucose | 10 | 10 |
| Peptone | 0.3 | |
| NaNO₃ | | 0.3 |
| KH₂PO₄ | 0.015 | 0.05 |
| K₂HPO₄ | 0.015 | 0.05 |
| MgSO₄·7H₂O | 0.01 | 0.05 |
| CaCl₂·2H₂O | 0.01 | |
| NaCl | trace | |
| KCl | | 0.05 |
| FeSO₄·7H₂O | trace | 0.001 |
| H₂O | remainder | remainder |

In comparison with the preferred medium, modified Czapek's medium may be used without appreciable decrease in the allo-isocitric acid production although the growth of the fungi in the medium is slightly delayed.

The optimum temperature range of the fermentation is from 20° C. to 35° C. In aerated shaking culture, it is particularly important that the pH of the nutrient medium be maintained around neutrality (about 5.0 to 7.5) until a substantial amount of allo-isocitrate is accumulated by the addition of calcium carbonate in the nutrient medium. The addition of $CaCO_3$ is especially important to obtain a high yield of said acid. Calcium carbonate is usually added in an amount ranging from about 1 to 10% by weight/volume of the medium.

As nitrogen source, urea, $(NH_4)_2SO_4$, $NH_4Cl$, $NH_4NO_3$, and the like can be used as well as peptone and $NaNO_3$. As carbon source, sucrose, fructose, mannose, xylose, arabinose, inuline and the like can also be used.

The fermentation is usually kept about one week or so if the submerged culture process is employed; whereas with a surface or solid culture, 2 to 3 weeks may be required.

In order to isolate the allo-isocitric acid, the mycelia are separated from the culture medium by filtration; the filtrate is neutralized with calcium hydroxide and is left standing overnight. Thereafter, the neutralized filtrate is concentrated to one third volume or less. The calcium salt of allo-isocitric acid is crystallized out from the concentrated filtrate.

In another method, one volume of filtered culture broth is mixed with one to three volumes of a water-miscible solvent such as lower alcohols (e.g. methyl alcohol and ethyl alcohol), lower ketones (e.g. acetone and methylethyl ketone) or dioxane. Subsequently, crude precipitate of calcium allo-isocitrate is formed in the mixture.

As an alternative way, the following method can also be used: calcium ions in the filtered culture broth can be precipitated as $CaSO_4$ by adding the theoretical amount of $H_2SO_4$ in the said broth. After removal of the $CaSO_4$ precipitate, the clear filtrate is concentrated in vacuum. Then the concentrate is neutralized with $Ca(OH)_2$ and $CaCO_3$. About two times the volume of acetone is added to the concentrate with mechanical stirring. Then, the precipitate of Ca-salt of allo-isocitric acid is formed.

The present invention is further illustrated in the following examples. It is to be understood that these examples are given by way of illustration and not of limitation.

EXAMPLE 1

A nutrient medium comprising by weight/volume 7.34% glucose, 0.3% peptone, 0.015% $K_2HPO_4$, 0.015% $KH_2PO_4$, 0.015% $MgSO_4·7H_2O$, 0.01% $CaCl_2·2H_2O$, 0.001% NaCl and 0.001% $FeSO_4 \cdot 7H_2O$, was used. Another nutrient medium containing about 1% (weight/volume) of separately sterilized calcium carbonate, in addition to the components mentioned above, was also used.

Each 100 ml. portion of these media was distributed into a separate 500 ml. shaking flask, and *Penicillium purpurogenum* Stoll var. *rubri-sclerotium* Thom (non-sclerotigenic type), FAT (Kyowa), and IAM, No. 1148* was inoculated thereto. The fermentation was carried out at 30° C.

The results of these fermentation processes are given below.

*Table I.—Nutrient medium with addition of calcium carbonate*

| Culture period (days) | 0 | 2 | 4 | 7 | 9 |
|---|---|---|---|---|---|
| Glucose remained (g./100 ml.) | 7.34 | 6.23 | 4.95 | 2.1 | 0.65 |
| Allo-isocitric acid (g./100 ml.) | | 0.205 | 0.832 | 2.016 | 1.830 |
| Volatile acid | | 0 | 0 | 0 | |
| pH | 6.0 | 6.0 | 5.0 | 3.8 | 3.5 |

*Table II.—Nutrient medium without calcium carbonate*

| Culture period (days) | 3 | 2 | 4 | 7 | 9 |
|---|---|---|---|---|---|
| Glucose remained (g./100 ml.) | 7.34 | 5.85 | 4.65 | 2.02 | 1.12 |
| Allo-isocitric acid (g./100 ml.) | | 0.035 | 0.150 | 0.125 | 0.115 |
| Volatile acid | | 0 | 0 | 0 | 0 |
| pH | 5.2 | 4.2 | 2.4 | 2.5 | 2.8 |

As shown in the above tables, when calcium carbonate was added to the nutrient medium, the yield of allo-isocitric acid was much improved. The yield of allo-isocitric acid as compared with the amount of glucose consumed was about 40%.

EXAMPLE 2

To a nutrient medium containing 10% glucose (all percentages are by weight/volume), 0.3% peptone, 0.015% $K_2HPO_4$, 0.015% $KH_2PO_4$, 0.01% $MgSO_4 \cdot 7H_2O$, 0.01% $CaCl_2 \cdot 2H_2O$, 0.001% NaCl and 0.001% $FeSO_4 \cdot 7H_2O$, 0 to 8% of separately sterilized $CaCO_3$ was added. After inoculation, fermentation was carried out at 30° C. for 8 days in the same manner as described in Example 1.

The results of these fermentation processes are given below.

---

* FAT—Faculty of Agriculture, Tokyo University.
IAM—Institute of Applied Microbiology, University of Tokyo.
Kyowa—Kyowa Fermentation Industry Co., Ltd.
(Journal of General and Applied Microbiology, vol. 2, Nos. 1–3, 1956, Tokyo, Japan.)

*Table III*

| $CaCO_3$ | 0 | 1 | 2 | 3 | 5 | 8 |
|---|---|---|---|---|---|---|
| pH | 2.7 | 3.2 | 3.4 | 3.5 | 4.5 | 4.8 |
| Glucose remained (mg./ml.) | 27.8 | 17.3 | 4.37 | 1.16 | 1.16 | 1.16 |
| Allo-isocitric acid (mg./ml.) | 5.72 | 32.6 | 53.6 | 70.4 | 75.6 | 84.8 |

In this experiment, all the $CaCO_3$ used was added in the initial medium. However, intermittent supplementation of $CaCO_3$ in response to the acid formation during the fermentation process also gave approximately the same results as shown in Table III.

EXAMPLE 3

5% (weight/volume) of $CaCO_3$ was added in the medium described in Example 2. After inoculation, fermentation was carried out under the same condition as shown in Example 1. The culture broth thus obtained was filtered and one to three volumes of acetone were added to one volume of the filtered broth. Thus, crude precipitate of Ca-salt of allo-isocitric acid was obtained. The results of this experiment are given in Table IV.

*Table IV*

| Volume of acetone used per volume of broth | Broth | | | Precipitates | | | Recovery Yield Percent |
|---|---|---|---|---|---|---|---|
| | Allo-isocitric acid (mg./ml.) | Volume used (ml.) | Total Allo-isocitric acid (g.) | Allo-isocitric acid (mg./g.) | Total Weight (g.) | Total Allo-isocitric acid (g.) | |
| 1.6 | 63.8 | 500 | 31.9 | 478 | 59.2 | 28.29 | 88.7 |
| 2.4 | 60.7 | 50 | 3.035 | 695 | 4.35 | 3.02 | 99.7 |

In this experiment, acetone was used as a precipitating agent. However, other water-miscible solvents such as lower alcohols (e.g. methyl alcohol and ethyl alcohol), lower ketones (e.g. methyl-ethyl-ketone) or dioxane were also used as precipitating agent, and similar results were obtained in every case.

EXAMPLE 4

A calculated amount of $H_2SO_4$ was added to the filtered broth obtained in the same manner as described in Example III. Precipitate of $CaSO_4$ thus formed was removed by filtration. The filtrate is then concentrated in vacuum and neutralized with $CaCO_3$. One to two volumes of acetone were added to one volume of the concentrate with mechanical stirring. Ca-salt of allo-isocitric acid was then precipitated. The results of the experiment are given in Table V.

*Table V*

| Broth | | | Precipitates | | | Recovery Yield (Percent) |
|---|---|---|---|---|---|---|
| Allo-isocitric acid (mg./ml.) | Volume used (l.) | Total allo-isocitric acid (g.) | Allo-isocitric acid (mg./g.) | Total weight (g.) | Total allo-isocitric acid (g.) | |
| 35.5 | 4.39 | 156 | 540 | 251 | 136 | 87 |

EXAMPLE 5

As the nitrogen source, peptone, $(NH_4)_2SO_4$, $NH_4Cl$, $NaNO_3$, $NH_4NO_3$, and urea were added respectively in an amount of 0.051 g. as nitrogen in a basal medium containing glucose 7 g., $KH_2PO_4$ 0.1 g., $MgSO_4 \cdot 7H_2O$ 0.05% g., and $FeSO_4 \cdot 7H_2O$ 0.001 g. Each medium was made up to 100 ml. with distilled water and autoclaved at 120° C. for 20 minutes, then 1% (weight/volume) of separately sterilized $CaCO_3$ was added to each medium. Fermentation was carried out in the same manner as described in Example 1. The results are shown in Table VI.

Table VI.—Allo-isocitric acid (g./100 ml.)

| Culture period (days) | 2 | 4 | 6 | 9 |
|---|---|---|---|---|
| N-source | | | | |
| Peptone | 0.396 | 2.080 | 2.400 | 2.362 |
| Urea | 0.224 | 0.384 | 0.832 | 1.600 |
| $(NH_4)_2SO_4$ | 0.365 | 0.576 | 0.800 | 2.080 |
| $NH_4Cl$ | 0.416 | 0.608 | 1.004 | 2.240 |
| $NaNO_3$ | 0.429 | 0.640 | 1.517 | 2.112 |
| $NH_4NO_3$ | 0.320 | 1.216 | 2.080 | 1.997 |

EXAMPLE 6

As carbon source, 5% (weight/volume) of sucrose, glucose, fructose, mannose, xylose, arabinose and inuline were used respectively. Otherwise, preparation of media and fermentation were carried out in the same manner as described in Example 1. After one week culture, production of allo-isocitric acid was analyzed. The results are given in Table VII.

Table VII

Carbon source: Allo-isocitric acid
(mg./10 ml.)
Sucrose _____ 120
Glucose _____ 97
Fructose _____ 129
Mannose _____ 82
Xylose _____ 82
Arabinose _____ 40
Inuline _____ 30

EXAMPLE 7

In Examples 1 to 6, *Penicillium purpurogenum* Stoll var. *rubri-sclerotium* Thom, FAT (Kyowa), IAM, No. 1148, was used as an allo-isocitric acid producer. Other species of Penicillium were also tested under the same conditions as described in Example 1. After 7 days' culture, production of allo-isocitric acid was analyzed. The results are given in Table VIII.

Table VIII

| Species name | Strain No. | Allo-isocitric acid (mg./100 ml.) |
|---|---|---|
| *P. sclerotiorum* van Beyma | FAT (Kyowa) IAM. No. 1181. | 946 |
| *P. expansum* (Link) Thom | FAT (Kyowa) IAM. No. 736. | 760 |
| *P. verruculosum* Peyronel | FAT (Kyowa) IAM. No. 1314. | 978 |
| *P. aculeatum* Raper and Fennell | FAT (Kyowa) IAM. No. 810. | 1,120 |

We claim:

1. A method of producing allo-isocitric acid which comprises cultivating a strain of fungi selected from the group consisting of *Penicillium purpurogenum* Stoll var. *rubri-sclerotium* Thom (sclerotia producing strains and non-sclerotigenic type), *Penicillium sclerotiorum* van Beyma, *Penicillium expansum* (Link) Thom, *Penicillium verruculosum* Peyronel and *Penicillium aculeatum* Raper and Fennell, under aerobic conditions in a nutrient fermentation medium containing carbohydrate material, inorganic salts and nitrogen source at a pH of about 5.0 to about 7.5 and recovering allo-isocitric acid from the fermented culture medium.

2. A method according to claim 1 in which from about 1 to 10% by weight/volume of calcium carbonate is added to the nutrient medium in order to adjust the pH of said medium to a value from about 5.0 to 7.5.

3. A method according to claim 1 in which fermentation is carried out at a temperature from 20° C. to 35° C.

4. A method according to claim 1 in which the carbohydrate material is a member selected from the group consisting of glucose, sucrose, fructose, mannose, xylose, arabinose and inuline.

5. A method according to claim 1 in which the nitrogen source is a member selected from the group consisting of peptone, urea, ammonium sulfate, ammonium chloride, sodium nitrate and ammonium nitrate.

6. A method according to claim 1 in which a water-miscible solvent selected from a group consisting of lower alcohols, lower ketones, and dioxane is added to filtered broth in order to form allo-isocitric acid salt precipitate and the said acid salt thus precipitated is recovered.

7. A method of producing allo-isocitric acid salt which comprises cultivating a strain of fungi selected from the group consisting of *Penicillium purpurogenum* Stoll var. *rubri-sclerotium* Thom (sclerotia producing strains and non-sclerotigenic type), *Penicillium sclerotiorum* van Beyma, *Penicillium expansum* (Link) Thom, *Penicillium verruculosum* Peyronel and *Penicillium aculeatum* Raper and Fennell, under aerobic conditions in a nutrient fermentation medium containing carbohydrate materials, inorganic salts and nitrogen sources at a pH of from about 5.0 to about 7.5, filtering the resulting culture broth, adding acetone to the filtered culture broth, whereby allo-isocitric acid salt precipitates, and recovering the precipitated salt.

8. A method of producing allo-isocitric acid salt which comprises cultivating a strain of fungi selected from the group consisting of *Penicillium purpurogenum* Stoll var. *rubri-sclerotium* Thom (sclerotia producing strains and non-sclerotigenic type), *Penicillium sclerotiorum* van Beyma, *Penicillium expansum* (Link) Thom, *Penicillium verruculosum* Peyronel and *Penicillium aculeatum* Raper and Fennell, under aerobic conditions in a nutrient fermentation medium containing carbohydrate materials, inorganic salts and nitrogen sources at a pH of from about 5.0 to about 7.5, filtering the resulting culture broth, adding methyl alcohol to the filtered culture broth, whereby allo-isocitric acid salt precipitates, and recovering the precipitated salt.

9. A method of producing allo-isocitric acid salt which comprises cultivating a strain of fungi selected from the group consisting of *Penicillium purpurogenum* Stoll var. *rubri-sclerotium* Thom (sclerotia producing strains and non-sclerotigenic type), *Penicillium sclerotiorum* van Beyma, *Penicillium expansum* (Link) Thom, *Penicillium verruculosum* Peyronel and *Penicillium aculeatum* Raper and Fennell, under aerobic conditions in a nutrient fermentation medium containing carbohydrate materials, inorganic salts and nitrogen sources at a pH of from about 5.0 to about 7.5, filtering the resulting culture broth, adding ethyl alcohol to the filtered culture broth, whereby allo-isocitric acid salt precipitates, and recovering the precipitated salt.

10. A method of producing allo-isocitric acid salt which comprises cultivating a strain of fungi selected from the group consisting of *Penicillium purpurogenum* Stoll var. *rubri-sclerotium* Thom (sclerotia producing strains and non-sclerotigenic type), *Penicillium sclerotiorum* van Beyma, *Penicillium expansum* (Link) Thom, *Penicillium verruculosum* Peyronel and *Penicillium aculeatum* Raper and Fennell, under aerobic conditions in a nutrient fermentation medium containing carbohydrate materials, inorganic salts and nitrogen sources at a pH of from about 5.0 to about 7.5, filtering the resulting culture broth, adding methyl ethyl ketone to the filtered culture broth, whereby allo-isocitric acid salt precipitates, and recovering the precipitated salt.

11. A method of producing allo-isocitric acid salt which comprises cultivating a strain of fungi selected from the group consisting of *Penicillium purpurogenum* Stoll var. *rubri-sclerotium* Thom (sclerotia producing strains and non-sclerotigenic type), *Penicillium sclerotiorum* van Beyma, *Penicillium expansum* (Link) Thom, *Penicillium verruculosum* Peyronel and *Penicillium aculeatum* Raper and Fennell, under aerobic conditions in a nutrient fermentation medium containing carbohydrate materials, inorganic salts and nitrogen sources at a pH of from about 5.0 to about 7.5, filtering the resulting culture broth, adding dioxane to the filtered culture broth, whereby allo-isocitric acid salt precipitates, and recovering the precipitated salt.

References Cited in the file of this patent

UNITED STATES PATENTS

| | | |
|---|---|---|
| 1,679,186 | Szucs | July 31, 1928 |
| 2,492,673 | Woodward et al. | Dec. 27, 1949 |
| 2,674,561 | Moyer | Apr. 6, 1954 |

OTHER REFERENCES

"Chemical Activities of Fungi," by J. W. Foster, Academic Press Inc., New York (1949), pages 395 to 397.

"A Manual of the Penicillia," by Raper et al., The Williams & Wilkins Company, Baltimore (1949), pages 18, 153, 188–189, 334, 645–646 and 693 relied on.